US007239956B2

(12) United States Patent
Sonoda et al.

(10) Patent No.: US 7,239,956 B2
(45) Date of Patent: Jul. 3, 2007

(54) APPARATUS FOR PROCESSING SIGNALS FROM SENSORS INCORPORATED IN IN-VEHICLE POWER TRAIN AND SYSTEM USING THE APPARATUS

(75) Inventors: Seiji Sonoda, Oobu (JP); Takahiro Goto, Ichinomiya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 29 days.

(21) Appl. No.: 11/294,414

(22) Filed: Dec. 6, 2005

(65) Prior Publication Data

US 2006/0123071 A1 Jun. 8, 2006

(30) Foreign Application Priority Data

Dec. 6, 2004 (JP) ............................ 2004-353030

(51) Int. Cl.
*G06F 19/00* (2006.01)
*F02M 7/00* (2006.01)

(52) U.S. Cl. ...................... 701/111; 701/115; 123/435; 710/33

(58) Field of Classification Search ................ 701/101, 701/102, 111, 114, 115; 123/435, 673, 674, 123/690; 710/22, 33, 69
See application file for complete search history.

(56) References Cited

U.S. PATENT DOCUMENTS 5,001,624 A 3/1991 Hoffman et al.
5,428,553 A * 6/1995 Chiba et al. ................ 700/293
5,734,920 A 3/1998 Gotoh et al.
7,081,895 B2 * 7/2006 Papakipos et al. .......... 345/506
7,142,215 B1 * 11/2006 Papakipos et al. .......... 345/506
2004/0012563 A1 * 1/2004 Papakipos et al. .......... 345/157
2005/0193156 A1 9/2005 Inoue et al.

FOREIGN PATENT DOCUMENTS

| | | |
|---|---|---|
| JP | 61-223964 | 10/1986 |
| JP | 63-201822 | 8/1988 |
| JP | 6-139185 | 5/1994 |
| JP | 7-19104 | 1/1995 |

* cited by examiner

*Primary Examiner*—John T. Kwon
(74) *Attorney, Agent, or Firm*—Nixon & Vanderhye P.C.

(57) ABSTRACT

An apparatus is provided for processing a signal outputted by a sensor installed in a power train control system mounted in a vehicle, the signal indicating an operating state of the power train and formatted in a fixed-point type of data. The apparatus comprises an A/D (analog to digital) converter, a DMA (direct memory access) controller and a transfer unit. The A/D converter converts the signal outputted by the sensor into a signal expressed as fixed-point type of digital data. The DMA controller is equipped with a format converter converting the fixed-point type of digital data to a floating-point type of digital data. The transfer unit transfers the floating-point type of digital data to a memory. The floating-point type of digital data are read out from the memory and subjected to floating-point type of digital processing for controlling the power train.

20 Claims, 6 Drawing Sheets

APPARATUS FOR PROCESSING SIGNALS FROM SENSORS INCORPORATED IN IN-VEHICLE POWER TRAIN AND SYSTEM USING THE APPARATUS

CROSS REFERENCE TO RELATED APPLICATION

The present application relates to and incorporates by reference Japanese Patent application No. 2004-353030 filed on Dec. 6, 2004.

BACKGROUND OF THE INVENTION

1. The Field of the Invention

The present invention relates to an apparatus for processing signals detected by sensors incorporated in a power train (i.e., vehicle drive system including an engine) mounted in a vehicle, and in particular, to an apparatus for processing signals detected by sensors to sense operating states of the power train, the processing including the digitalization of the detected signals.

2. Related art

Recent vehicles which are available in the market are mostly provided with power train control systems to control their drive systems (i.e., power trains such as engines). Japanese Patent Laid-open publication No. 7-19104 discloses such a power train control system, in which analog signals detected by sensors sensing operating states of a drive system are digitized into digital data by an A/D converter and the digital signals are directly transferred to a memory via a DMA (Direct Memory Access) controller.

In other words, the power train control system is ordinarily configured such that it operates using a microcomputer as the main device. Thus when the microcomputer takes in signals detected by the sensors via an A/D converter, the DMA controller is used to lessen a calculation load to be imposed on a central processing unit (CPU).

By the way, in this conventional power train control system, the digital data which has been transferred from the DMA controller to the memory is then subjected to digital processing executed by the CPU. The digital processing includes removal of noise contained in the detected signals and analysis of waves of the detected signals.

In cases where the detected signals are required to undergo higher-precision digital possessing which includes analyzing waveforms of signals from knock sensors for determining a knocking phenomenon of an engine, it is conceivable that the digital processing at the CPU is performed using floating-point arithmetic.

Due to the fact that the floating-point arithmetic handles the floating-point type of digital data expressed by both a mantissa part consisting of a line of values of each digit and an exponent part indicating the position of the decimal point, the floating-point arithmetic has a wider range in numerals to be expressed. In contrast, fixed-point type of digital data has a decimal point fixed at a specific digit. Thus, compared to the fixed-point type of digital data, the floating-point arithmetic is much more precise. This is why the CPU uses the floating-point arithmetic for applying the digital processing to the detected signals.

Actually however, the digital data transferred from DMA controller to the memory is a fixed-point type of data produced by the A/D converter. Thus, in order to allow the CPU to apply the floating-point arithmetic to the digital data, it is required to convert the digital data from the fixed-point type of data to the floating-point type of data.

Accordingly, if such a conversion is imposed on the CPU, the load of processing which should performed by the CPU is obliged to increase. In addition, the number of accesses to the memory also increases, thus causing an excessive duty (i.e., load) of the memory bus due to having access to the memory. It is also imaginable that this excessive duty of the memory bus becomes an obstacle to the other types of processing to be executed by the CPU, such as processing for controlled variables for driving an engine.

To be more specific, the detected signals (that is, digital data which has been A/D-converted by the A/D converter) are converted in its format from the fixed-point type to the floating-point type through the processing executed by the CPU, and the conversion involves transferring data from the DMA controller to the memory, reading data from the memory by the CPU, and writing converted data into the memory by the CPU. That is, access to the memory is required three times. In particular, in the case that digital data requires to be A/D-converted at a shorter sampling period for digital processing at higher speed, the memory will be subject to frequent access based on the above three-time manner. Hence the bus to the memory is almost always occupied with accessing data and subsequent steps of data conversion. This results in a concern that the CPU cannot perform the various types of remaining processing in a steady manner.

SUMMARY OF THE INVENTION

An object of the present invention is to provide, with due consideration to the drawbacks of the above conventional apparatus, an in-vehicle power train control system equipped with a sensor signal processing apparatus in which, with no increase in both of the processing load of a CPU and the duty of a memory bus, analog signals from sensors are digitized and then converted from the fixed-point type to the floating-type to allow the data to be subject to predetermined digital processing in the floating-point type.

In order to accomplish the above object, as one aspect, the present invention provides an apparatus for processing a signal outputted by a sensor installed in a power train control system mounted in a vehicle, the signal indicating an operating state of the power train and formatted in a fixed-point type of data, comprising: an A/D (analog to digital) converter converting the signal outputted by the sensor into a signal expressed as fixed-point type of digital data; a DMA (direct memory access) controller equipped with a format converter converting the fixed-point type of digital data to a floating-point type of digital data; and a transfer unit transferring the floating-point type of digital data to a memory, the floating-point type of digital data being read out from the memory and subjected to floating-point type of digital processing for controlling the power train.

As another aspect, the present invention provides an apparatus for controlling a power train mounted in a vehicle: the apparatus comprising: a sensor outputting a signal indicating an operating state of the power train, the signal being formatted in a fixed-point type of data; an A/D (analog to digital) converter converting the signal outputted by the sensor into a signal expressed as fixed-point type of digital data; a DMA (direct memory access) controller equipped with a format converter converting the fixed-point type of digital data to a floating-point type of digital data; a transfer unit transferring the floating-point type of digital data to a memory; and a controller reading out the floating-point type of digital data from the memory and performing floating-point type of digital processing for controlling the power train on the read-out floating-point type of digital data.

Still as another aspect, the present invention provides a method for processing an analog signal outputted by an analog sensor installed in a power train control system mounted in a vehicle, the analog signal indicating an operating state of the power train and formatted in a fixed-point type of data, comprising steps of: A/D (analog to digital) converting the analog signal outputted by the sensor into a digital signal expressed as a fixed-point type of digital data; format-converting the fixed-point type of digital data to a floating-point type of digital data; and transferring the floating-point type of digital data to a memory, the floating-point type of digital data being read out from the memory and subjected to floating-point type of digital processing for controlling the power train.

BRIEF DESCRIPTIONS OF THE DRAWINGS

Figure 5:
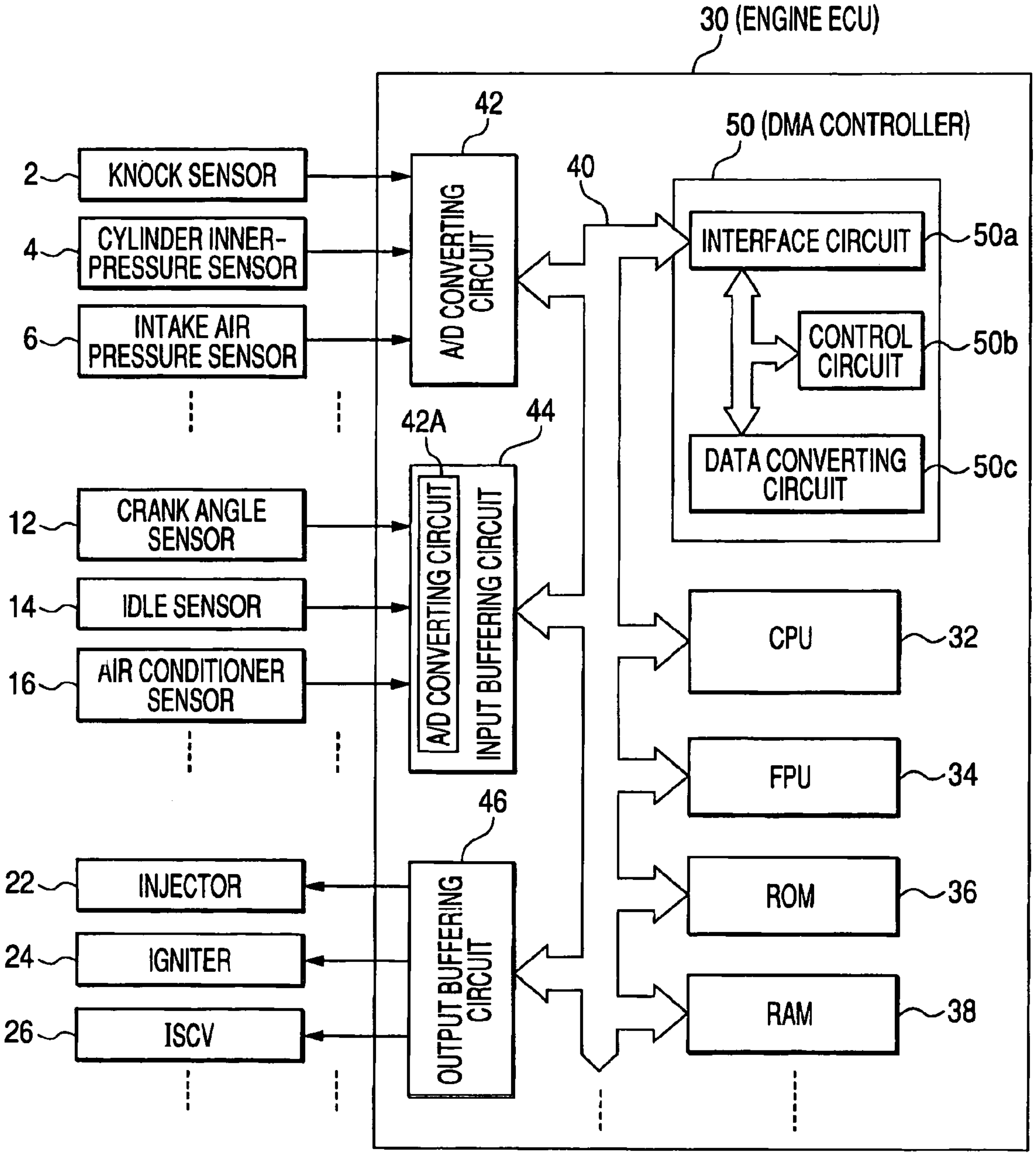
Figure 6A:
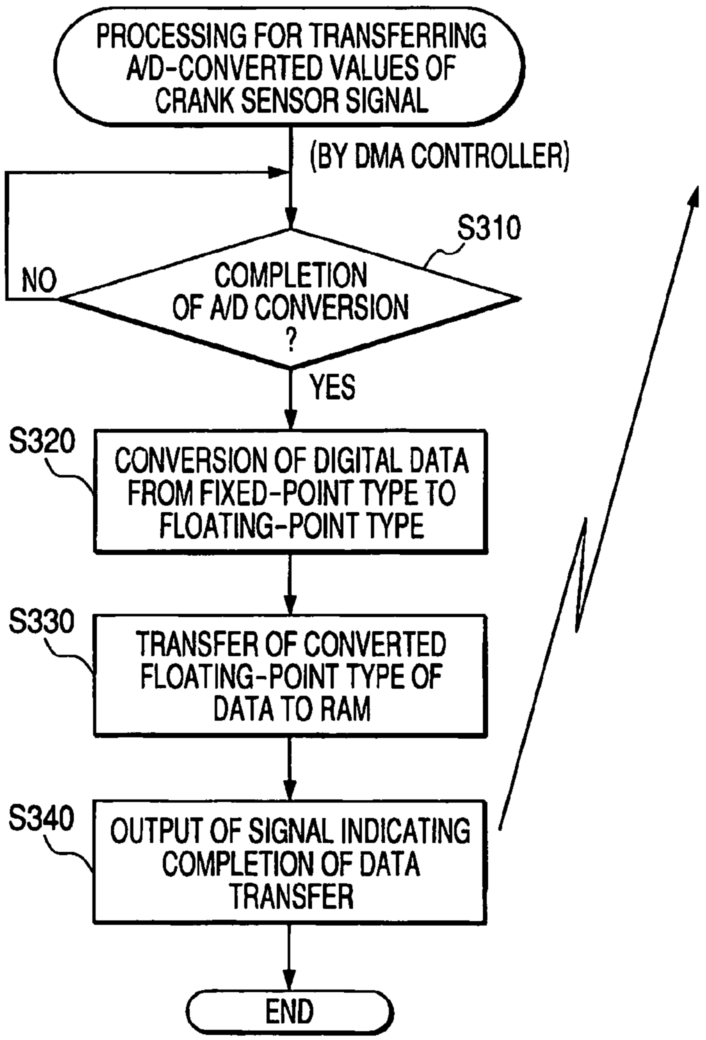
Figure 6B:
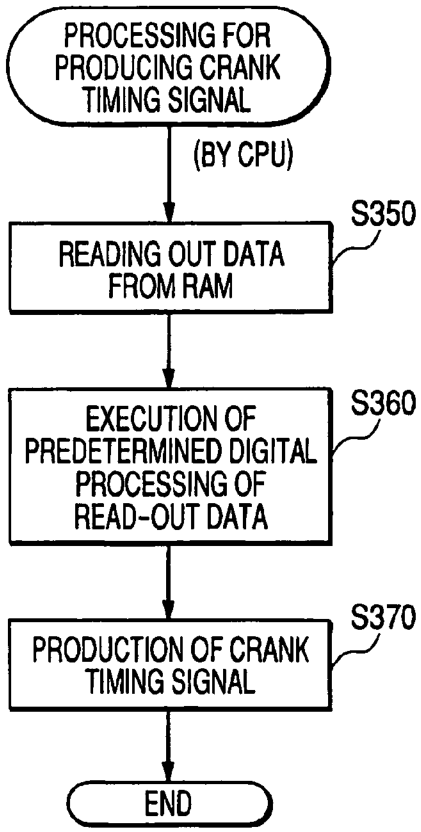

FIG. 5 a block diagram showing an outlined configuration of a power train control system according to a second modification of the embodiment; and FIGS. 6A and 6B are flowcharts showing processing for a cylinder inner-pressure sensor signal in the second modification, which is executed by the DMA controller or the CPU incorporated in the power train control system.

DETAILED DESCRIPTION OF THE PREFERRED EMBODIMENT

Embodiments of the present invention will now be described in conjunction with the appended drawings.

Figure 1:
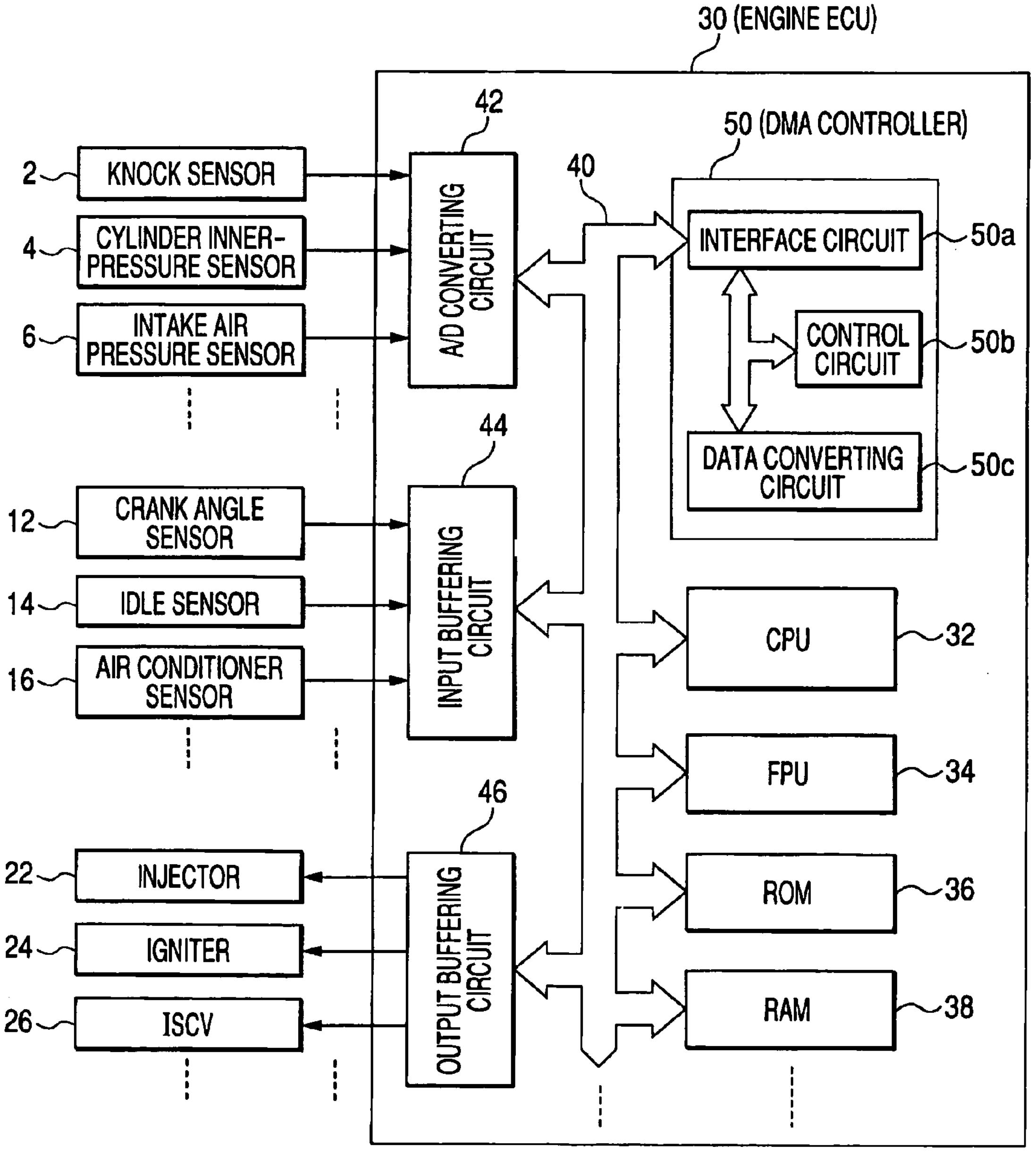
FIG. 1 is a block diagram showing an outlined configuration of a power train control system according to an embodiment of the present invention.
Figures 2A, 2B, 2C:
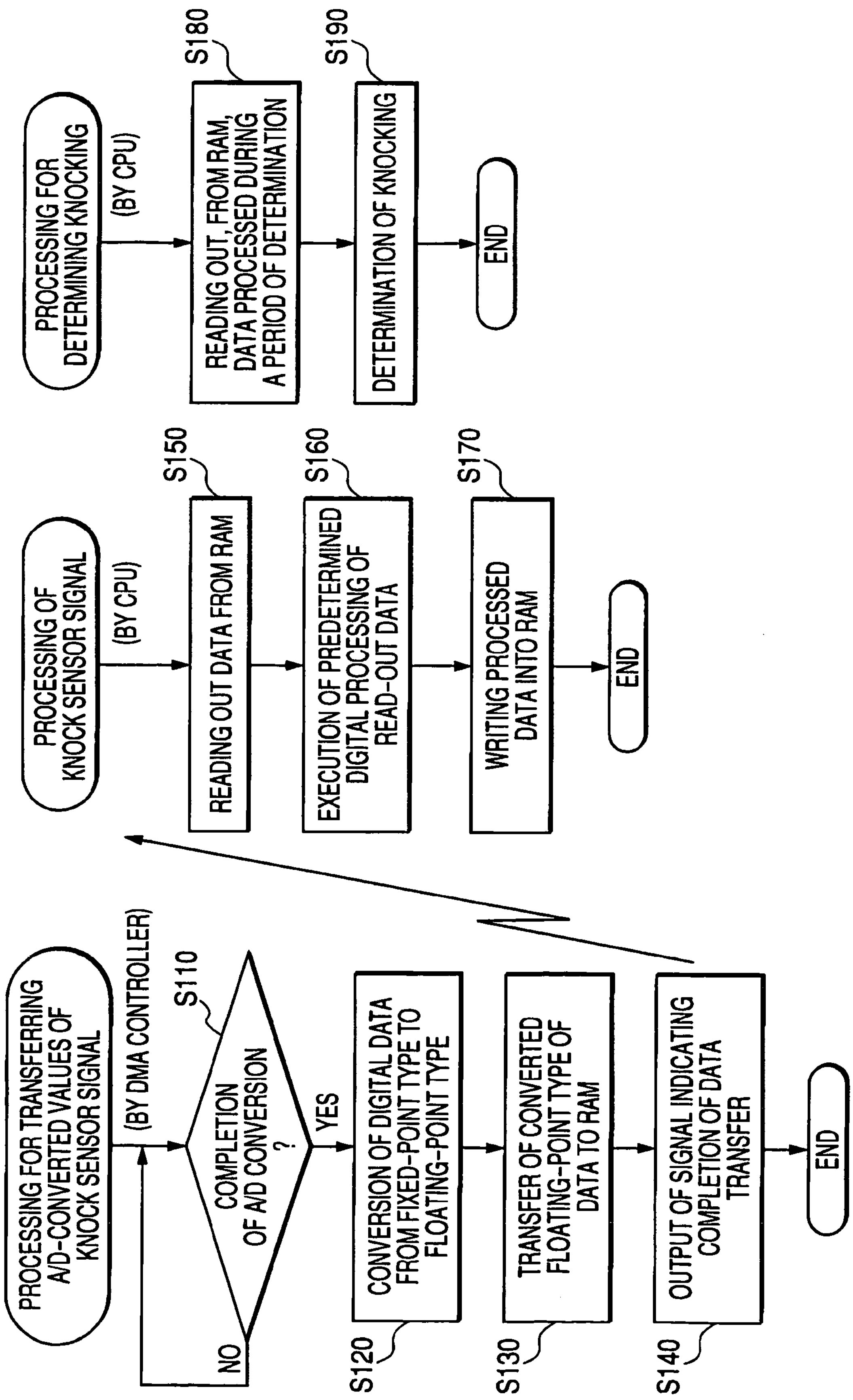
FIGS. 2A to 2C are flowcharts showing processing for a knock sensor signal, which is executed by a DMA controller or a CPU incorporated in the power train control system.
Figure 3:
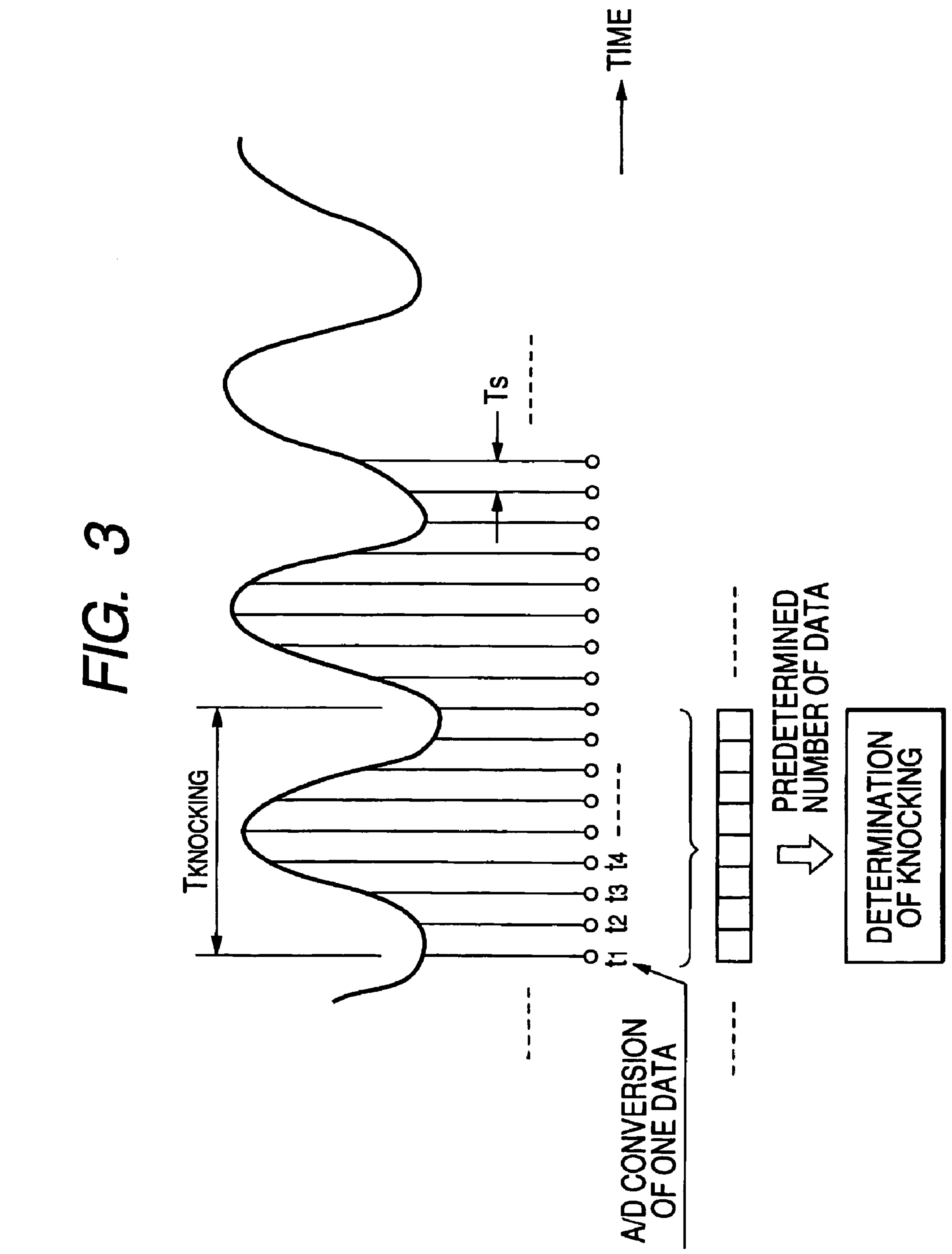
FIG. 3 is an illustration explaining operation timings in the embodiment.

Referring to FIGS. 1 to 3, an embodiment of the present invention will now be described, in which a power train control system according to the embodiment of the present invention is shown.

FIG. 1 outlines the configuration of the power train control system according to the embodiment. This power train control system functionally includes a sensor signal processing apparatus according to the present invention.

The power train control system according to the present embodiment is designed for controlling an engine which is a source of power of a vehicle and falls into the drive system of the vehicle. The power train control system, as shown in the figure, comprises a group of analog sensors generating analog-quantity signals in response to detecting various operational states of the engine. Such analog sensors include a knock sensor 2 for knocking a knocking phenomenon of the engine, a cylinder inner-pressure sensor 4 for detecting a cylinder inner pressure of the engine, and an intake air pressure sensor 6 for detecting pressure in an intake pipe of the engine.

This control system further comprises a group of digital sensors, which include a crank angle sensor 12, an idle switch 14, and an air conditioning switch 16, which generate digitized signals depending on operational states of the engine. The crank sensor 12 generates a pulse signal at every predetermined rotational angle of a crank shaft of the engine. The idle switch 14 exhibits its on-state when a throttle valve of the engine is totally closed. Further, the air conditioning switch 16 is turned on when an air conditioner is put in operation which is operated by a drive force from the engine.

Signals detected by the sensors the groups of sensors, which compose the groups of above sensors, are supplied to an engine ECU (electronic control unit) 30. This engine ECU 30 uses the various kinds of received signals to calculate amounts of various controlled variables, and on the basis of the resultantly calculated amounts, drives predetermined controlled systems including an injector 22, an igniter 24, and an ISCV (idling control valve) 26 so that the engine is controlled to be optimum depending on the current operated states of the vehicle. The controlled variables include amounts of fuel injection to be supplied for injection from the injector 22 to each cylinder of the engine (not shown), ignition timing at which an ignition plug of each cylinder of the engine is spark-discharged using the igniter 24, and opening of a valve for controlling an idling engine speed by adjusting the opening of the ISCV 26 placed in an intake path bypassing the throttle valves.

In order to achieve such operations, the engine ECU 30 comprises, as its essential component, a microcomputer equipped with a CPU 32, FPU 34 (i.e., a CPU dedicated to floating-point type of calculation), ROM 36, RAM 38 and bus 40 connecting those components with each other. In addition, as shown in FIG. 1, the engine ECU 30 comprises an A/D converting circuit (A/D converter) 42, an input buffering circuit 44, an output buffering circuit 46, and a DMA (direct memory access) controller 50 having an interface circuit 50*a*, a control circuit 50*b*, and a data converting circuit 50*c*.

Of these, the CPU 32 will execute programs of which data are previously stored in the ROM 36, so that predetermined processing for the engine control is performed by the CPU 32. In this processing, various analog signals detected by the sensors of the analog sensor group enters the engine ECU 30, in which the analog signals are digitized by the A/D converting circuit 42. In parallel, various digital signals (such as pulsed signals and on/off switching signals) detected by the sensors of the digital sensor group also enters the engine ECU 30, in which the digital signals are preprocessed by the input buffering circuit 44. Based on respective data resultant from those digitized signals and originally digital signals, the CPU 32 calculates amounts of the foregoing controlled variables and causes the output buffering circuit 46 to output various drive signals depending on the calculated results. The outputted drive signals are supplied to the injector 22, igniter 24, ISCV 26, and others, respectively for driving them.

In the engine ECU 30, the DMA controller 50 is connected with the bus 40. This DMA controller 50 is in charge of directly writing, into, the RAM 38, specified data of the digital data A/D-converted by the A/D converting circuit 42. Such data to be written directly is specified by the CPU 32 in advance. This direct writing the specified data into the RAM 38, not being by way of the CPU 32, will relieve the load to be processed by the CPU 32 itself.

In the DMA controller 50, both of the interface circuit 50*a* and the control circuit 50*b* are provided to acquire A/D-converted digital data from the A/D converting circuit 42 via the bus 40 and to transfer the digital data from the DMA controller 50 to the RAM 50*b* via the bus 40. In addition to those circuits, the data converting circuit 50*c* is also placed in the DMA controller 50. The data converting circuit 50*c* is directed to conversion of the data format of the digital data (i.e., A/D-converted values) obtained from the A/D converting circuit 42 through the interface circuit 50*a*. That is, the format conversion is converting from fixed-point type of data to floating-point type of data.

In the present embodiment, of the detected signals to be A/D-converted at the A/D converting circuit 42, the signals detected by the knock sensor 2 (called "knock sensor signal") is designated as an objective data to be converted to the floating-point type of data and then transferred to the RAM 38. The reason is that the knock sensor signal requires both of the A/D conversion cycle to be very shorter in time and waveform analysis to be higher in precision.

In other words, in cases where the A/D converting circuit 42 obeys the command from the CPU 32 so that the circuit 42 engages in A/D conversion of the knock sensor signal, the control circuit 50*b* will execute the processing for transferring the A/D-converted values of the knock sensor signal, as shown in FIG. 2A.

In the present embodiment, the A/D converting circuit 42, bus 40, interface circuit 50*a*, control circuit 50*b*, data converting circuit 50*c*, and functional part of the CPU 32 compose the sensor signal processing apparatus according to the present invention. Of these, the interface circuit 50*a*, control circuit 50*b*, and data converting circuit 50*c* compose the format converter according to the present invention. The interface circuit 50*a*, control circuit 50*b*, and functional part of the CPU 32 compose a transfer unit according to the present invention. The CPU 32 functionally corresponds to the controller according to the present invention.

In connection with FIGS. 2A and 3, the transfer processing will now be described more, which is executed by the control circuit 50*b* in the DMA controller 50.

In the transfer processing, first, at step S110, it is determined whether or not a signal notifying completion of the A/D conversion, which is outputted from the A/D converting circuit 42, has entered the interface circuit 50*a*. This determination allows the control circuit 50*b* to wait for completing the A/D conversion of the knock sensor signal by the A/D converting circuit 42. Responsively to the input of the A/D-conversion completion notifying signal, it is determined by the control circuit 50*b* that the A/D conversion of the knock sensor signal has been completed (refer to at each timing t1 (t2, t3, . . . , in FIG. 3). Thus the processing at the control circuit 50*b* is made to proceed to step S120.

At step S120, through the bus 40 and the interface circuit 50*a*, the A/D-converted values of the knock sensor signal are taken in from the A/D converting circuit 42 and then supplied to the data converting circuit 50*c*. This circuit 50*c* operates to convert, into floating-type of data, the fixed-point type of A/D-converted values coming from the A/D converting circuit 42.

Then at step S130, the control circuit 50*b* operates to cause the converted data by the data converting circuit 50*b* to be transferred from the circuit 50*b* to the RAM 38 via the interface circuit 50*a* and then the bus 40. The converted data are, of course, A/D-converted values whose data format is converted to the floating-point type. On completion of the transfer of the converted data, the processing proceeds to step S140, where the control circuit 50*b* sends to the CPU 32 a signal notifying the completion of transferring the data via the interface circuit 50*a* and the bus 40, before ending the transfer processing.

In response to receiving the data transfer completion notifying signal from the DMA controller 50, the CPU 32 executes, as shown in FIG. 2B, the processing for the knock sensor signal.

In this processing, at step S150, the CPU 32 first reads, from the RAM 38, converted data which has already been transferred from the DMA controller 50 to the RAM 38. Such converted data are A/D-converted values of the knock sensor signal and converted to the floating-point type.

Then, at the succeeding step S160, the CPU 32 permits the FPU 34 to use both of the current converted data and the past converted data which had been read out over several times in the past (or values after signal processing) in order to perform digital signal processing on the floating-point basis. The digital signal processing is executed to remove, from the currently acquired converted data, noise signal components and unnecessary signal components whose frequencies are outside a frequency range necessary for determining the knocking. Then, at step S170, the converted data which have been subjected to the signal processing is written into the RAM 38, before the present processing is ended.

After all, during an interval of time Ts shown in FIG. 3, one A/D-converted data (for example, 8 bit data) undergoes the procedures from step S220 in FIG. 2A to step S270 in FIG. 2B. This serial processing will be repeated every interval Ts to produce each data that has been experienced the digital signal processing in the floating-point type On the other hand, the converted data which have been written into the RAM 38 after the processing shown in FIGS. 2A and 2B are used by the CPU 32 for knocking determination processing, which is shown in FIGS. 2C and 3. This knocking determination processing is performed by the CPU 32 in synchronism with the rotations of the engine.

To be specific, in this knocking determination processing, a predetermined number of data which have been processed in FIGS. 2A and 2B during a period of time (refer to $T_{knocking}$ in FIG. 3) for knocking determination which is in synchronism with engine rotations are read out from the RAM 38 (S180). Using both time-series data resultant from the read-out data and predetermined parameters for determining the knocking phenomenon, it is determined whether or not there occurs a knocking phenomenon in the engine (step S190).

In this way, in the present power train control system, the signal detected by the knock sensor 2 is sent to the engine ECU 30, where the detected signal is digitized by the A/D converting circuit 42, and then the resultant digital data (i.e., A/D-converted values) are subjected to the format conversion of the digital data. That is, the data converting circuit 50*c* in the DMA controller 50 converts the data format of the digital data from the fixed-point type of data to the floating-point type of data, which is good for calculation with higher precision. The format-converted digital data detected by the knock sensor 2 is then transferred to the RAM 38 for storage therein.

Accordingly, both of the calculations performed by the CPU 34 and the calculation performed by the FPU 34 on the floating-point basis in the engine ECU 30 make it possible that the knock sensor signal is subjected to digital processing with precision. Thus whether or not a knocking phenomenon occurs in the engine can precisely be determined with high precision. In addition, due to the fact that the detected knocking sensor signal is format-converted to the floating-point type by the DMA controller 50, there is no need for performing such a format conversion by means of the CPU 32. This means that the calculation load of the CPU 32 for the data conversion can be avoided from increasing.

Moreover, because the A/D-converted values of the knock sensor signal are converted into the floating-point type of data within in the DMA controller 50, only one time of access from the DMA controller 50 to the RAM 38 is enough for writing the A/D-converted values (data) into the RAM 38. Hence, compared with the format conversion to be carried out by the CPU 32, the number of access times to the RAM 38 can be lowered. It is therefore possible to prevent or relieve the conventional drawback that the duty (i.e., communication load) of the bus 40 increases so heavily that the operations of the CPU 32 for the primary processing for controlling the engine are influenced.

(Modifications)

As the above, though one embodiment has been described, the present invention will not be limited to such an embodiment, but may be modified into various modes without departing from the spirit of the present invention.

(First Modification)

For example, the DMA controller 50 may be modified as follows. In the foregoing embodiment, the DMA controller 50 is configured such that the knock sensor signal is A/D-converted into the floating-point type of data. However, this is not a definitive list. In the DMA controller 50, instead of or in addition to employing the knock sensor signal, the signal detected by the cylinder inner-pressure sensor 4 (i.e., cylinder inner-pressure sensor signal) may be digitized into floating-point type of data so that those data are stored in the RAM 38.

Figures 4A, 4B, 4C:
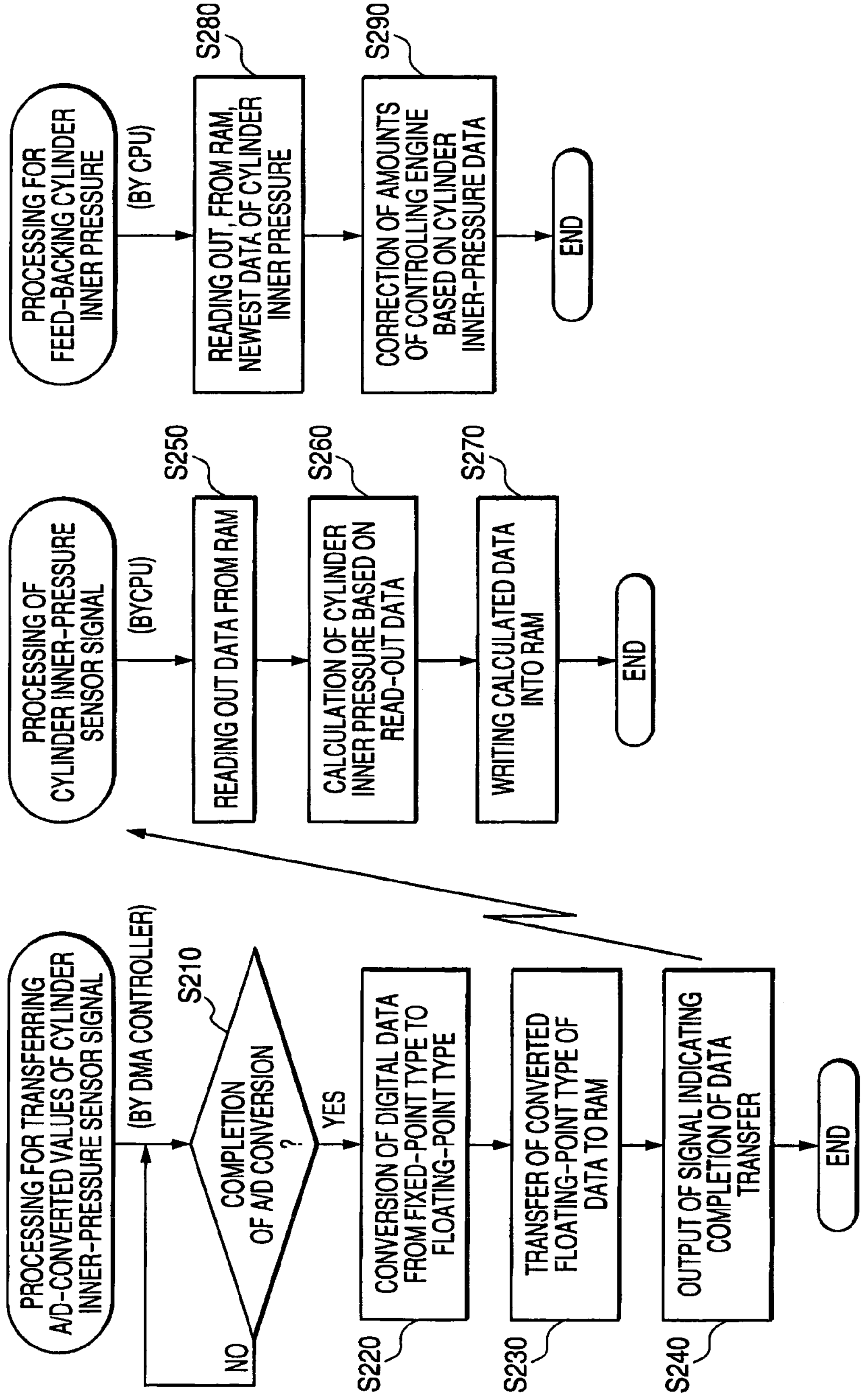
FIGS. 4A to 4C are flowcharts showing processing for a cylinder inner-pressure sensor signal in a first modification of the embodiment, which is executed by the DMA controller or the CPU incorporated in the power train control system.

In order to perform such a conversion with the cylinder inner-pressure sensor signal, how both of the converting circuit 50*b* in the DMA controller 50 and the CPU 32 operate will now be exemplified in connection with FIGS. 4A–4C.

FIG. 4A shows the processing for transferring A/D-converted values of the cylinder inner-pressure sensor signal, which is executed by the control circuit 50*b* when those A/D-converted values are converted into a floating-point type of format.

Specifically, in the similar way to the case of the knock sensor signal shown in FIG. 2A, at step 210 in FIG. 4A, the control circuit 50*b* of the DMA controller 50 determines whether or not a signal indicating completion of A/D conversion of the cylinder inner-pressure sensor signal has been issued from the A/D converting circuit 42. That is, the DMA controller 50 waits for completing the A/D conversion, during which time the determination is performed. When it is determined that the conversion has been completed at step S210, the processing is made to proceed to step S220, the resultant A/D-converted values are taken into the data converting circuit 50*c*, where the A/D-converted values of the cylinder inner-pressure sensor signal are converted to floating-point type of data.

Then, the processing is shifted to step S230, the converted data, that is, the digital cylinder inner-pressure sensor signal values whose format are floating-point type, are transferred from the data converting circuit 50*c* to the RAM 38. In response to completing the transfer, the processing at the next step S240 is initiated such that the control circuit 50*b* issues, to the CPU 32, a signal showing the completion of transferring the cylinder inner-pressure sensor signal, before the processing at the control circuit 50*b* is terminated.

As shown in FIG. 4B, responsively to the signal showing the completion of the transfer of the cylinder inner-pressure sensor signal from the DMA controller 50, the CPU 32 will execute processing with the cylinder inner-pressure sensor signal which has been formatted into the floating-point type of data.

First, at step S250 in FIG. 4B, the CPU 32 reads out the converted data from the RAM 38. The converted data are the A/D-converted values of the floating-point type of cylinder inner-pressure sensor signal and has been stored in the RAM 38.

After this reading operation, the CPU 32 shifts its operation to step S260, where the CPU 32 removes noise signal components from the read-in converted data and then permits the FPU 34 to use the data to calculate a cylinder inner pressure in the floating-point type of calculation. At the succeeding step S270, the CPU 32 writes calculated data (values) of the cylinder inner pressure into the RAM 38, before the processing for the cylinder inner pressure is finished.

The data of the cylinder inner pressure written in the RAM 38 will be processed by the CPU 38, as shown in FIG. 4C. That is, the CPU 32 uses such data while the CPU 32 executes processing for performing feedback control of the cylinder inner pressure. This feedback control is one of the main routines carried out by the CPU 32 to control the operations of the engine.

To be specific, at step S280, in the processing for feeding back the cylinder inner pressure, the CPU 32 reads out the newest cylinder inner pressure data (values) from the RAM 38. Then, at step S290, the CPU 32 uses the read-out cylinder inner pressure data to correct controlled variables (including fuel injection amount and ignition timing) for the engine in a manner such that the ignited state of the engine is optimized. Correcting the engine-controlled variables in this way using the data of the cylinder inner pressure makes it possible that the CPU 32 detects the cylinder inner pressures of.the engine with higher precision in order for that such controlled variables are corrected in an optimum manner.

Accordingly, in the similar way to the foregoing embodiment, in comparison with the conventional, the calculation load imposed on the CPU 32 can be reduced or suppressed and the number of access to the RAM 38 can be lessened so that the duty of the bus 40 is suppressed, because the A/D-converted data (values) of the cylinder inner pressure signal are transferred to the RAM 38 after being converted in the floating-point type of data at the data converting circuit 50*c*.

As a further variation, the signal from the intake air pressure senor 2 can be processed by the same procedures as those for the signals from the knock sensor 2 and cylinder inner-pressure sensor 6, as have been described. Of course, one or more signals from those analog types of sensors 2, 4, 6, etc. can be processed solely or in parallel with each other in the same way as the above.

(Second Modification)

Another modification relates to the A/D conversion of the pulsed signal detected by the crank angle sensor 12 (i.e., "crank angle sensor signal"). Specifically, as shown in FIG. 5, a dedicated A/D converting circuit 42A may be placed, for example, in the input buffering circuit 44 so as to A/D-convert the crank angle sensor signal in a dedicated and fast manner. In this A/D conversion, sampling periods for the crank angle sensor signal are shorter in time than the pulse periods thereof. And the resultant A/D-converted values of this signal may be converted in format into floating-point type within the DMA controller 50 so that those format-converted data are stored in the RAM 38.

Of course, the A/D converting circuit 42 placed for the analog type sensors 2, 4, 6, . . . may be used in common for the A/D conversion of the crank angle sensor signal, as long as the foregoing condition concerning the sampling periods is met.

This modification is described in FIGS. 6A and 6B. FIG. 6A shows the processing for transferring A/D-converted data (values) of the crank angle sensor signal, which is executed by the control circuit 50*b* of the DMA controller 50. This transfer processing is required when the A/D-converted data (values) of the crank angle sensor signal converted into floating-point type of data.

In the processing shown in FIG. 6A, similarly to that in FIGS. 2A and 3A, the first step S310 allows the control circuit 50*b* to determine whether or not the A/D converting circuit 42A has issued a signal indicative of completion of the A/D conversion of the crank angle sensor signal. Thus, until receiving the signal, the control circuit 50 waits for the completion of the A/D conversion. In cases where the determination reveals that the A/D conversion has been completed, the processing at the control circuit 50*b* is made to shift to step S320, where the A/D-converted data (values) are allowed to be taken in the data converting circuit 50*c* in order for that those A/D-converted data are converted into floating-point type of data. That is, the A/D-converted data of the signal from the crank angle sensor 12 are converted in format into the floating-point type.

After this conversion, the processing at step S330 is performed by the control circuit 50*b* in such a manner that the converted data is transferred to the RAM 38. On completion of the data transfer, the at step S340, the control circuit 50*b* issues, to the CPU 32, a signal indicating that the data of the crank angle sensor signal have been transferred, before the processing is then terminated.

In response to the issuance of the signal indicating the completion of data of the crank angle sensor signal, the processing shown in FIG. 6B will be executed by the CPU 32. In the present embodiment, this processing is called “crank angle sensor signal processing.”

As shown in FIG. 6B, the CPU 32 first executes the process at step S350, where the CPU 32 reads out, from the RAM 38, the data which were transferred from the DMA controller 50 and stored in the RAM 38. The data are digital data corresponding to A/D-converted floating-point type values of the crank angle sensor signal. Then the processing proceeds to step S360, where the CPU 32 executes digital signal processing to remove noise signal components from the read-out data. This digital signal processing is carried out by the FPU 34 under the floating-point type of computation.

After this, the processing further proceeds to step S370, where amounts of change of the crank angle sensor signal, which are computed based on the last value of the data which have experienced the digital signal processing at step S360, are used to determine whether or not there is an edge in the crank angle sensor signal and resultant determined results are used to generate a crank timing signal at every predetermined crank angle of the engine. The edge of the crank angle sensor signal is a rising edge or a decaying edge thereof.

As described above, the crank angle sensor signal, which changes in pulse width depending on the rotations of the engine, is subject to the A/D conversion and then the conversion to floating-point type of data, before being stored in the RAM 38. The stored data is then subject to the digital processing under the floating-point type of computation. Thus the foregoing various merits are still kept. In addition, in a condition in which the input buffer circuit 44 excludes installation of waveform forming circuits and filters which are usually used in the conventional apparatus, the crank timing which is in synchronism with the rotations of the crank shaft of the engine can be detected with accuracy. It is therefore possible to perform, at desired timing and with high precision, the processing for control which should be done in synchronism with the rotations of the engine.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for processing a signal outputted by a sensor installed in a power train control system mounted in a vehicle, the signal indicating an operating state of the power train and formatted in a fixed-point type of data, comprising:

an A/D (analog to digital) converter converting the signal outputted by the sensor into a signal expressed as fixed-point type of digital data;

a DMA (direct memory access) controller equipped with a format converter converting the fixed-point type of digital data to a floating-point type of digital data; and a transfer unit transferring the floating-point type of digital data to a memory, the floating-point type of digital data being read out from the memory and subjected to floating-point type of digital processing for controlling the power train.

2. The apparatus according to claim 1, wherein the A/D converter is configured to convert an analog signal, as the signal, outputted by an analog sensor serving as the sensor, the analog signal indicating the operating state of the power train.

3. The apparatus according to claim 2, wherein the analog sensor is a knock sensor outputting the analog signal showing a knocking phenomenon of an engine which is part of the power train.

4. The apparatus according to claim 2, wherein the analog sensor is a cylinder inner-pressure sensor outputting the analog signal showing a cylinder inner pressure of an engine which is part of the power train.

5. The apparatus according to claim 2, wherein the analog sensor is an intake air pressure sensor outputting the analog signal showing a pressure in an intake pipe of the engine.

6. The apparatus according to claim 2, wherein the analog sensor is at least one of a knock sensor outputting the analog signal showing a knocking phenomenon of an engine which is part of the power train, a cylinder inner-pressure sensor outputting the analog signal showing a cylinder inner pressure of an engine which is part of the power train, and an intake air pressure sensor outputting the analog signal showing a pressure in an intake pipe of the engine.

7. The apparatus according to claim 1, wherein the A/D converter is configured to convert a pulsed signal, as the signal, outputted by a pulse sensor serving as the sensor, the pulsed signal indicating the operating state of the power train.

8. The apparatus according to claim 7, wherein the pulse sensor is a crank sensor signal outputting the pulsed signal at every predetermined crank angles on the engine which is part of the power train.

9. The apparatus according to claim 8, wherein the A/D converter converting the signal outputted by the crank sensor into the signal expressed as fixed-point type of digital data, at a sampling period shorter than periods of the pulsed signal outputted by the crank sensor.

10. An apparatus for controlling a power train mounted in a vehicle: the apparatus comprising:

a sensor outputting a signal indicating an operating state of the power train, the signal being formatted in a fixed-point type of data;

an A/D (analog to digital) converter converting the signal outputted by the sensor into a signal expressed as fixed-point type of digital data;

a DMA (direct memory access) controller equipped with a format converter converting the fixed-point type of digital data to a floating-point type of digital data;

a transfer unit transferring the floating-point type of digital data to a memory; and a controller reading out the floating-point type of digital data from the memory and performing floating-point type of digital processing for controlling the power train on the read-out floating-point type of digital data.

11. The apparatus according to claim 10, wherein the sensor is an analog sensor outputting, as the signal, an analog signal indicating the operating state of the power train.

12. The apparatus according to claim 11, wherein the analog sensor is a knock sensor outputting the analog signal showing a knocking phenomenon of an engine which is part of the power train and the controller is configured to perform the floating-point type of digital processing for determining whether or not the knocking phenomenon has occurred.

13. The apparatus according to claim 11, wherein the analog sensor is a cylinder inner-pressure sensor outputting the analog signal showing a cylinder inner pressure of an engine which is part of the power train and the controller is configured to perform the floating-point type of digital processing for calculating the cylinder inner pressure of the engine.

14. The apparatus according to claim 11, wherein the analog sensor is an intake air pressure sensor outputting the analog signal showing a pressure in an intake pipe of the engine.

15. The apparatus according to claim 11, wherein the analog sensor is at least one of a knock sensor outputting the analog signal showing a knocking phenomenon of an engine which is part of the power train, a cylinder inner-pressure sensor outputting the analog signal showing a cylinder inner pressure of an engine which is part of the power train, and an intake air pressure sensor outputting the analog signal showing a pressure in an intake pipe of the engine.

16. The apparatus according to claim 10, wherein the sensor is a pulse sensor outputting, as the signal, a pulsed signal indicating the operating state of the power train.

17. The apparatus according to claim 16, wherein the pulse sensor is a crank sensor signal outputting the pulsed signal at every predetermined crank angles on the engine which is part of the power train and the controller is configured to perform the floating-point type of digital processing for producing a predetermined crank timing signal in synchronism with rotations of the engine.

18. The apparatus according to claim 17, wherein the A/D converter converting the signal outputted by the crank sensor into the signal expressed as fixed-point type of digital data, at a sampling period shorter than periods of the pulsed signal outputted by the crank sensor.

19. A method for processing an analog signal outputted by an analog sensor installed in a power train control system mounted in a vehicle, the analog signal indicating an operating state of the power train and formatted in a fixed-point type of data, comprising steps of:

A/D (analog to digital) converting the analog signal outputted by the sensor into a digital signal expressed as fixed-point type of digital data;

format-converting the fixed-point type of digital data to a floating-point type of digital data; and transferring the floating-point type of digital data to a memory, the floating-point type of digital data being read out from the memory and subjected to floating-point type of digital processing for controlling the power train.

20. The method according to claim 19, wherein the analog sensor is at least one of a knock sensor outputting the analog signal showing a knocking phenomenon of an engine which is part of the power train, a cylinder inner-pressure sensor outputting the analog signal showing a cylinder inner pressure of an engine which is part of the power train, and an intake air pressure sensor outputting the analog signal showing a pressure in an intake pipe of the engine.

* * * * *